No. 851,055. PATENTED APR. 23, 1907.
B. BESKOW.
TRACTOR.
APPLICATION FILED OCT. 3, 1905. RENEWED SEPT. 24, 1906.
5 SHEETS—SHEET 3.
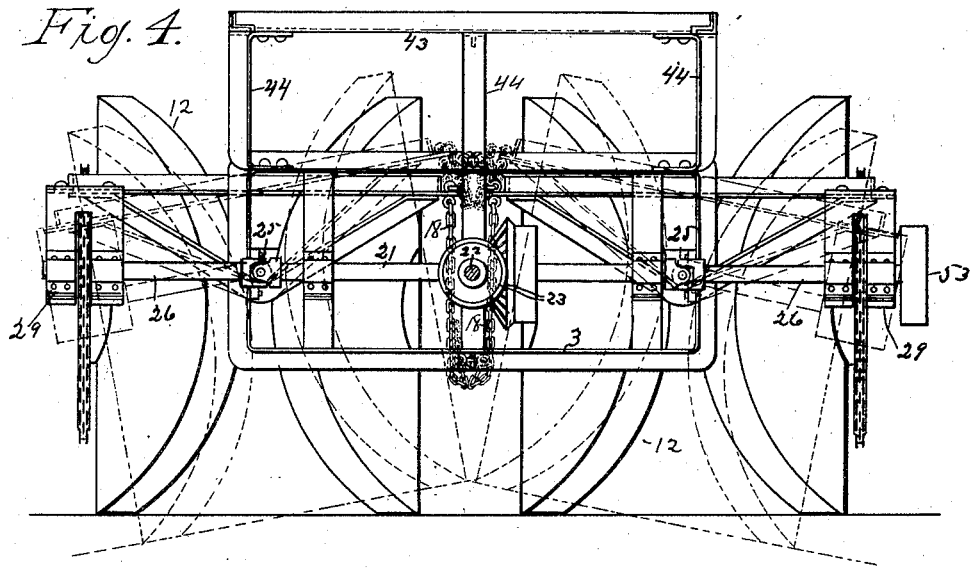
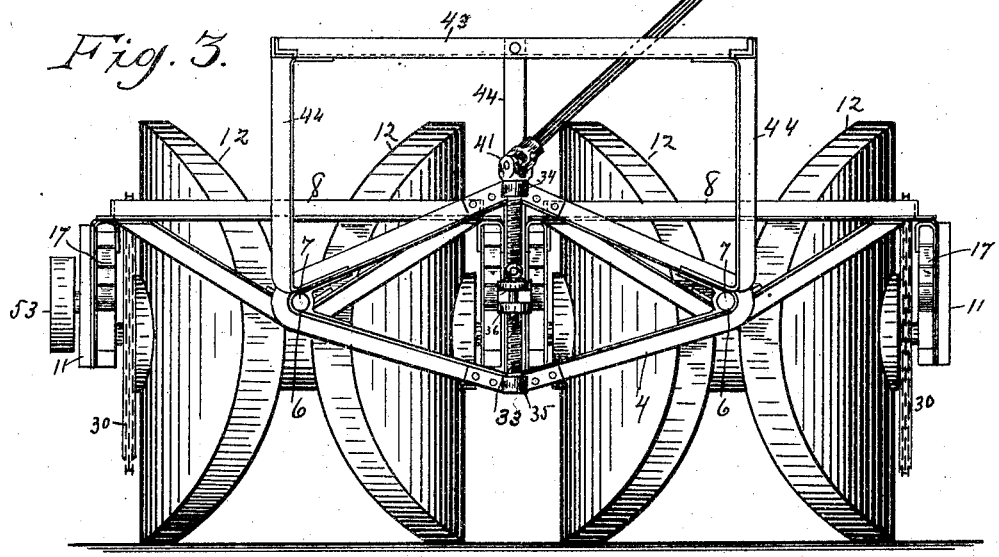

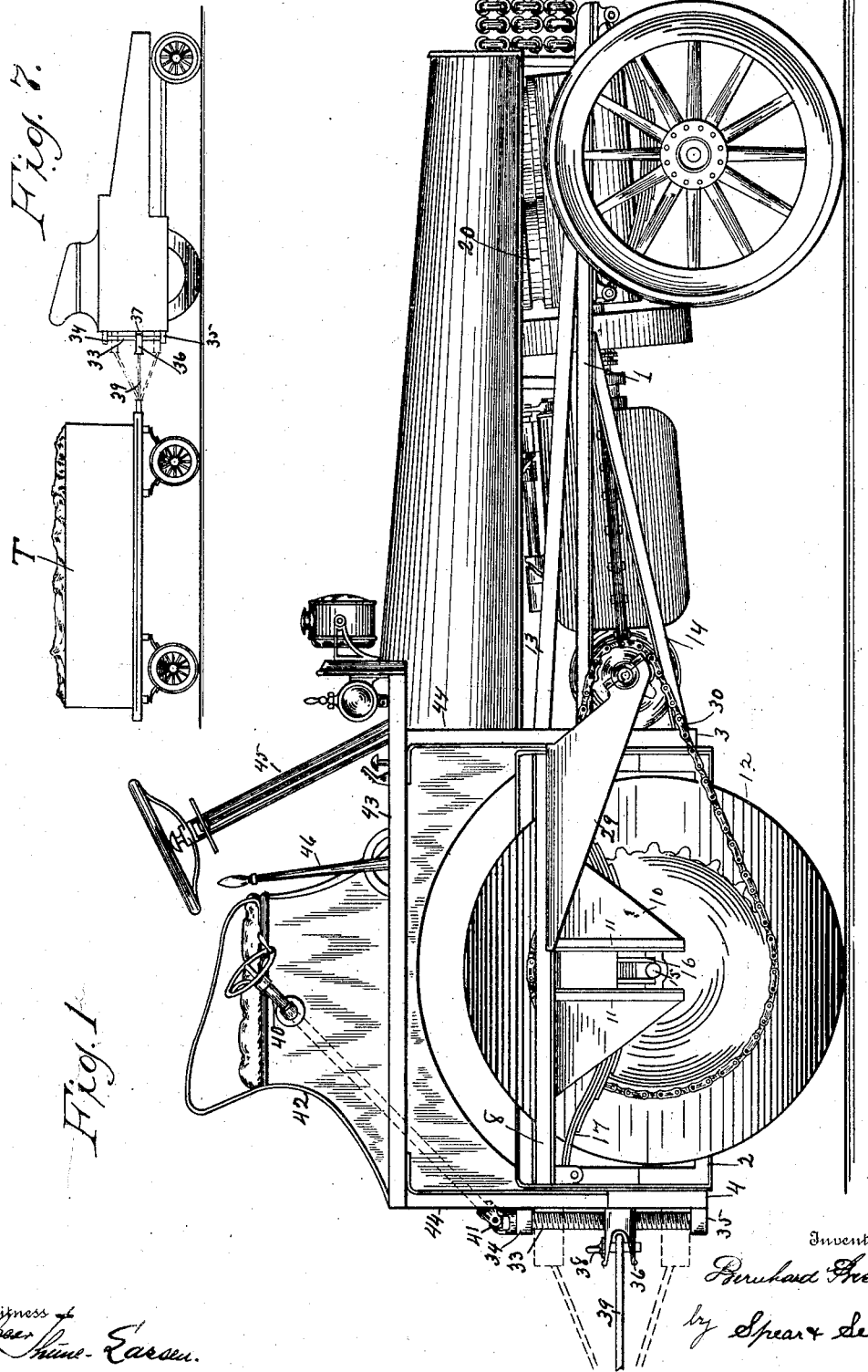

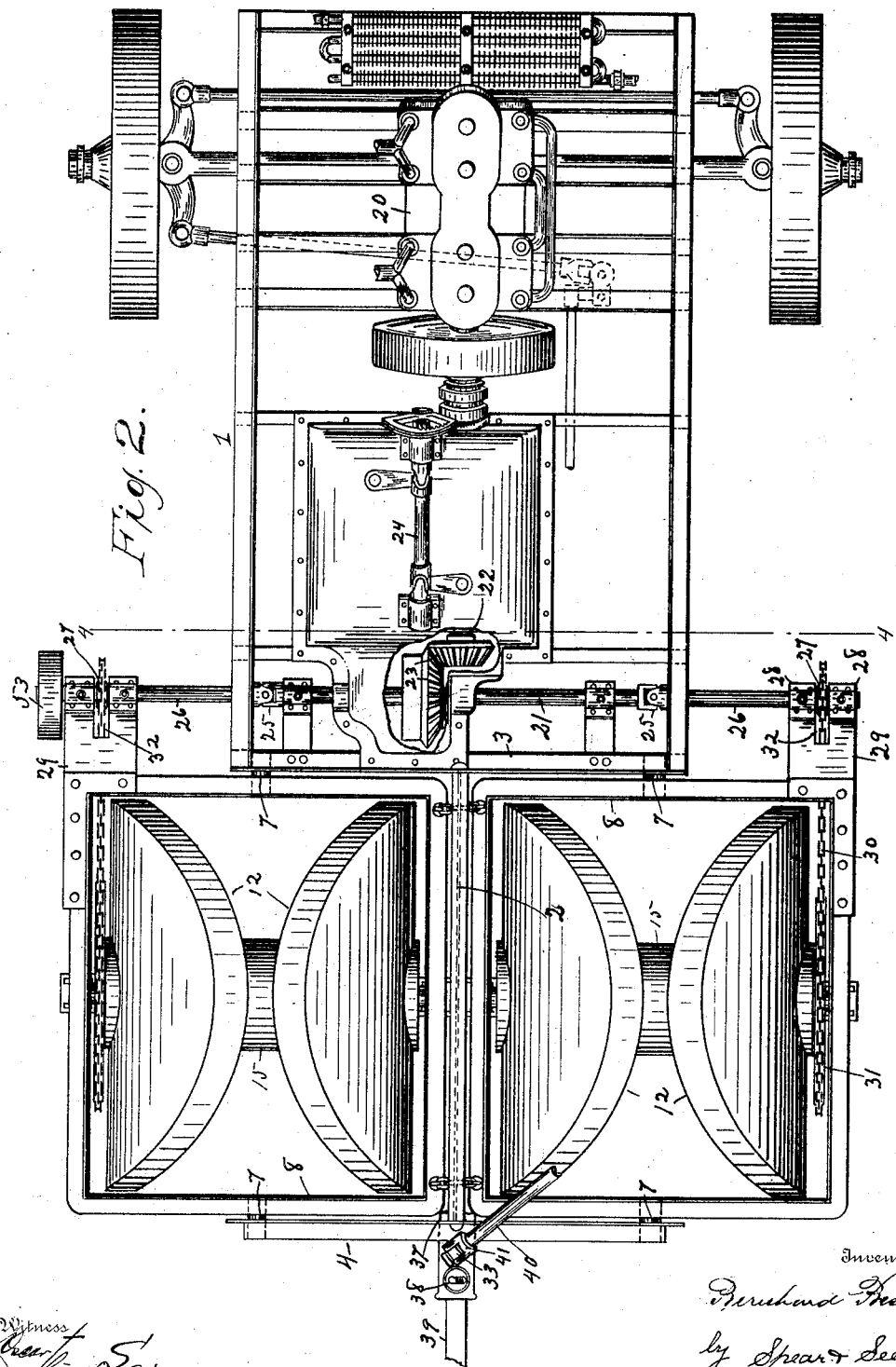

No. 851,055. PATENTED APR. 23, 1907.
B. BESKOW.
TRACTOR.
APPLICATION FILED OCT. 3, 1905. RENEWED SEPT. 24, 1906.
5 SHEETS—SHEET 4.
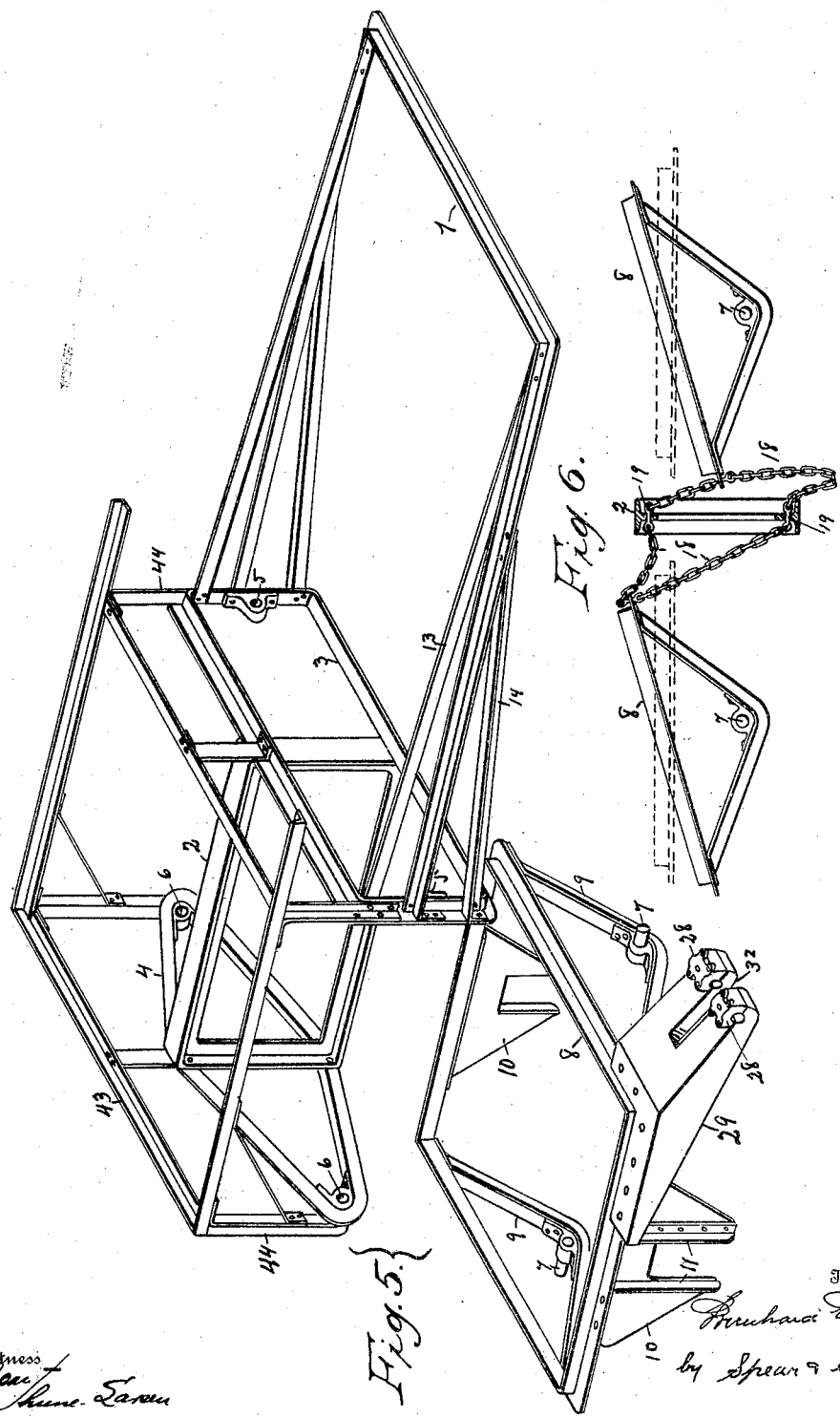

No. 851,055. PATENTED APR. 23, 1907.
B. BESKOW.
TRACTOR.
APPLICATION FILED OCT. 3, 1905. RENEWED SEPT. 24, 1906.
5 SHEETS—SHEET 5.
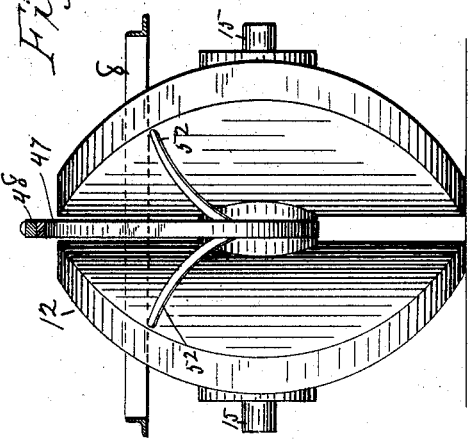
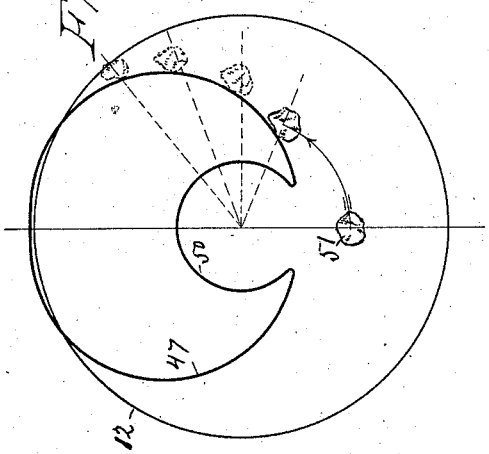
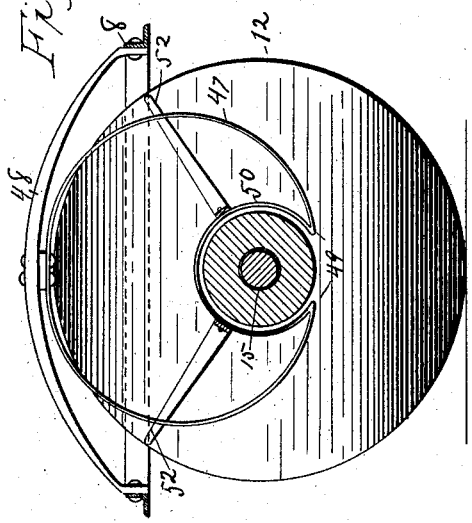
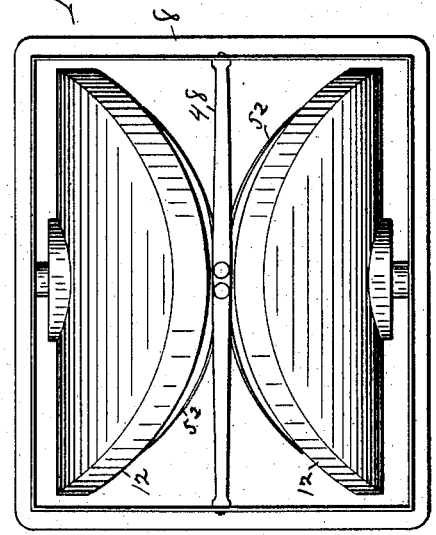

UNITED STATES PATENT OFFICE.

BERNHARD BESKOW, OF SAN FRANCISCO, CALIFORNIA.

TRACTOR.

No. 851,055.　　　Specification of Letters Patent.　　Patented April 23, 1907.

Application filed October 3, 1905. Renewed September 24, 1906. Serial No. 335,963.

*To all whom it may concern:*

Be it known that I, BERNHARD BESKOW, a citizen of the United States, residing at San Francisco, in the county of San Francisco and State of California, have invented certain new and useful Improvements in Tractors, of which the following is a specification.

My invention relates to that class of motor-cars which are intended as a substitute for the draft-horse, be it for commercial, military, or agricultural purposes.

The great value of the commercial motor-car is now understood as affording the best means of tapping sections of the country and agricultural centers that at present may be more or less isolated and connecting them with the railroads; but the success of this industry depends largely upon a cheap and efficient construction of the motor-car and of the possibility of applying said car to the existing implements of the farmer and merchants, as plows, harvesters, wagons, trucks, &c. A truck fitted out with mechanical driving appliances to take the place of the present horse-propelled vehicle answers only to the special purpose for which it is intended and calls for a special design, which consequently involves very heavy expense for the consumer.

One object of my invention is to provide a motor-car that will be efficient and can be applied to any implement or vehicle of present construction and use.

Another object is to provide the motor-car with wheels having increased tractive power—as, for instance, those having sinuous peripheries similar to what is shown in my Patent No. 694,303, February 25, 1902.

Another object is to vary the tractive power of the motor by varying the downward pressure upon the traction-wheels of the same by means of the load contained in the trailer.

An embodiment of my invention is shown in the accompanying drawings, in which—

Figure 1 is a side elevation of what I shall call a "tractor." Fig. 2 is a top plan view. Fig. 3 is a rear end view with the wheels turned ninety degrees to their position in Figs. 1 and 2. Fig. 4 is a transverse sectional view on the line 4 4 of Fig. 2 looking toward the rear, with the wheels turned ninety degrees to their position in Figs. 1 and 2. Fig. 5 is a perspective view of the main frame with similar views of one of the wheel-frames detached. Fig. 6 is a fragmentary sectional view showing the means for limiting the tilting motion of the wheels. Fig. 7 is a side elevation, on a reduced scale, showing the tractor provided with a trailer. Figs. 8, 9, 10, and 11 are vertical sectional top plan, end elevation, and diagrammatic views, respectively, of means for cleaning the wheels.

In constructing a machine in accordance with my invention two or more wheel-frames are pivotally mounted in a main frame, which is preferably composed of a horizontal rectangular front portion 1 and a vertical rectangular portion 2. The rear end of frame 1 is preferably in the form of a vertical frame 3, to the center of which the forward end of the rear frame 2 is rigidly secured, and rigidly secured to the rear end of the frame 2 and forming a part thereof is a diamond-shaped frame 4. Pivotally mounted in bearings 5 and 6 of the frames 3 and 4, respectively, by means of trunnions 7 are the wheel-carrying frames 8. All of these frames are preferably formed from angle-iron, and the wheel-carrying frames 8 are rectangular, with depending supports on all four of the sides thereof. The front and rear supports are each preferably formed from inclined bars 9 and the side supports from plates 10, each plate provided with a recess and two parallel vertical bars 11. The trunnions 7 are secured to the lower ends of the bars 9 and permit the frames 8 to oscillate, as shown in Figs. 4 and 6, when the wheels 12 are passing over uneven ground. If desired, additional rigidity may be given to the main frame by two braces 13 and 14 upon each side, which are connected at their forward ends to the sides of the frame 1 and at their rear ends to the top and bottom, respectively, of the frame 3.

The wheels may be of any desired construction; but I prefer to use the reversely-curved ones shown in my patent hereinbefore referred to. The axles 15 of the wheels are arranged transversely on the frames 8, and the ends of each of them are journaled in suitable boxes 16, which are mounted in the guides or ways formed by the bars 11. Springs 17 are secured at their ends to the frames 8 and rest upon the boxes 16 or upon the axles 15 adjacent to the boxes, and thereby cause the wheels to support the frames yieldingly. The oscillation of the frames 8 in either direction is limited by chains 18, which are connected with said rames at one end and with the main frame 2 at the other. Preferably there are two chains at each end of each of the frames, each chain being connected with its frame in any suitable manner, as by eyebolts 19, and with the frame 2 in a similar manner, one of the chains being connected with the top of the frame 2 and the other one at the bottom. By this construction the lower chains limit the upward movement of inner sides of the frames 8, and the upper chains limit their downward movement, as shown in Figs. 4 and 6.

The forward end of the tractor can be supported by ordinary wheels in the usual manner, as shown in the drawings, or it may be provided with duplicates of the rear wheels 12, which can be pivotally supported between vertical frames and driven in the same manner as shown for said rear wheels.

Mounted upon the forward portion of the frame is any suitable motor, as 20, which is connected with or drives a power-shaft 21, which is journaled transversely across the rear end of frame 1. The connection between said shaft and the power-shaft 22 of the motor is shown as bevel-gear 23; but other means, as the ordinary sprocket-gear, could be used, if desired. Speed-changing mechanism 24 may be used, preferably that invented by myself; but as it forms no part of the present invention and is covered by a separate application it is not shown more particularly in the drawings.

Flexibly connected with each end of the shaft 21, as by means of a universal joint 25, is a short shaft 26, which is provided with a sprocket-wheel 27 and journaled in bearings 28 at the ends of downwardly and forwardly extending brackets 29. Chains 30 connect the sprocket-wheels 27 with sprocket-wheels 31, each of which is rigidly secured to one of the axles 15 at the outer side of one of the wheels 12. The joints 25 are each arranged in a line with the trunnions 7 of the frame 8 upon that side which will permit of the transmission of power to each of the wheels, whether its frame is horizontal or inclined, and the amount of inclination is limited by the chains to the angle at which the shafts can be operated most effectively. The brackets 29 are preferably bifurcated or slotted, as shown at 32, within which the sprocket wheels 27 are mounted, and the bearings 28 are so located relative to the boxes 16 that the vertical movement of the axles 15 will not tighten the chains 30 so as to break them nor loosen them to such an extent as to render them inoperative.

When employing a motor-car for the purpose of hauling loads, it has generally been considered advisable to place such a great weight over the driving-wheels to provide for the necessary adhesion between the ground and the wheels in case a very heavy load is to be hauled or if encountering a steep grade en route. In addition to this the tread of the wheels have been provided with rubber tires, ribs, or flanges, which engaged with the ground and increased the friction or tractive power of the wheels; but all of these expedients are objectionable, for rubber tires are soon cut to pieces, and considerable power is required to transmit the dead-weight of the machine, and ordinary bridges are not built to support such loads, and when the ribs do not fill up and lose their efficiency they cut up the road-bed to such an extent as to prohibit the use of such wheels on county roads, highways, or within the city. I avoid these objections by a very simple connection between the rear end of my tractor and a trailer T or car on which is placed the load to be hauled and by means of which connection a portion of the weight of the load is transferred to or made effective for increasing the downward pressure of the tractor upon its traction-wheels. In the form of such device shown in the drawings a screw-threaded shaft 33 is mounted vertically in bearings 34 and 35 at the rear end of the car, preferably at the top and bottom, respectively, of the frame 4. A nut 36 is mounted on the shaft so as to be moved up or down when the shaft is rotated. The forward end of the nut is provided with a band or loop 37, which engages with or fits around the rear end of the frame 2, and thereby causes the weight of the load which is connected with the coupling-pin 38 by the draw-bar 39 to be mostly sustained or carried directly by the main frame of the car. With the parts arranged in this manner it is evident that if the shaft be rotated so as to move the nut upward above the horizontal or line of direct pull the forward end of the draw-bar will be inclined upward, and the weight of the load on the trailer will pull down upon the rear of the tractor, and thereby add that much to the tractive power of the drive-wheels; but if the nut be moved downward the result will be just the opposite. Hence the downward movement of the nut is only used in backing the tractor and its load, in which the push upon the downwardly-inclined draw-bar will cause the weight of the forward end of the trailer to be transmitted to the rear end of the tractor and force it down upon the traction-wheels. In this manner the effectiveness of my tractor for hauling purposes can be readily increased at any time by simply rotating the screw-shaft, which can be done by means of a crank-shaft 40, one end of which is connected with the shaft by means of a universal joint 41, and the other end is adjacent to the side of the seat 42. The seat is preferably mounted on a platform 43, which is supported above the driving-wheels by means of posts 44. An ordinary steering-shaft 45 is also arranged adjacent to the seat, as is the speed-changing lever 46, thereby enabling the attendant to have complete control of the tractor at all times without moving from his seat.

While the effectiveness of a motor provided with plain straight wheels can be increased by the mechanism above described to a point where the wheels will simply rotate, and thereby sink themselves into the ground, it is evident that by forming each wheel from two disks each curved transversely to form the segment of a circle and arranging the disks with their curvatures opposite and the ends of the segments approaching each other the periphery of the wheel will virtually form a duplex laterally-sinuous tread in which the lateral sinuosities of the respective parts coincide reversely. With such a wheel the additional weight that is placed upon it by operating the weight-shifting mechanism will increase its utility in a threefold manner. In the first place its tractive power will be increased at the point of contact of the wheel with the ground in exactly the same manner and in the same proportion as though the tread of the wheel upon each side of the point of contact were straight instead of sinuous. In the second place the increased weight will have a tendency to sink the wheel into the ground, which will increase its tractive power by providing a greater embankment or wall of earth, to the rear of and against which the side walls of the sinuosities will engage, and thereby prevent slippage. In addition to these advantages in increasing the tractive power of the wheel the walls of the sinuosities would present an increased bearing-surface to the ground directly underneath them, which to a certain extent would counteract the tendency that the increased weight would have to sink the wheel into the ground, and especially if the soil should be soft or yielding. In this manner the efficiency of my tractor would be increased by the use of my patented wheels upon the ordinary road-bed, whether it be hard or soft, and it would be rendered peculiarly useful for work upon the farm, where the ground is frequently soft and yielding. In such cases the draft of the load would be increased by the softer ground; but at the same time the resistance to sinking would be rapidly increased by the flaring walls of the sinking wheels, and the tractive power of the wheels would also be increased by the increasing height of the wall or abutment of ground formed at the operating sides of the serpentine walls of the rotating wheels.

To a certain extent the edges of the serpentine tread of the wheels perform the same functions as the ribs or flanges on the ordinary wheel, for they present an inclined edge to bear against the ground to the rear, and thereby prevent slippage; but the tread of the wheel is so broad that it does not sink in and cut up the road like the flanges do, and in addition to this it is impossible to cause the treads of the wheels to track each other upon the road, and it is therefore impossible to cut the road into ruts and ruin it, as with wheels having the ordinary straight tread; but, on the contrary, the constant lateral movement of the point of contact of the tread with the ground as the wheel moves forward causes the wheels to contact with substantially all of the ground underneath the axles, and thereby have a tendency to roll the road and keep it even without the use of a cylinder.

If either wheel of the tractor should strike a rigid obstruction, as the side of a projecting stone that is too high for it to readily pass over, the wheel would slip until the lateral movement of the point of contact of its sinuous tread would either permit the wheel to pass to the side of the stone or to reach such a point that the wheel could pass over it; but in case an obstruction should be caught up between the two disks of a wheel, as is liable to happen when the tractor is used upon soft soil in which rocks are embedded, it is desirable that means be provided for removing such obstructions to prevent the interior of the wheel from being gradually filled up with accumulated rocks and clay, and thereby form a smooth even surface or periphery. The form of clearer I prefer to use and which is shown in Figs. 8, 9, 10, and 11 consists of a flat spring 47 in the form of a segment of a spiral, which spring is of such a width as to pass between the narrowest part of the disks when the wheel is rotated. The upper portion of the spring is rigidly secured to an upwardly-curved bar 48, which is secured at its ends to the opposite sides of the frame 8, and the lower portion of the spring preferably terminates below the hub of the wheel in two ends 49. These ends are preferably connected by a substantially circular band 50, of spring-steel, which encircles the hub. This construction forms a curved surface which extends from the center of the wheel outwardly and upwardly beyond the periphery and which surface is adapted to engage with the obstruction, as a stone 51 in Fig. 11, and gradually force it outward in a radial direction, as shown in dotted lines in said figure, until it passes beyond the periphery and is dropped to the ground. Auxiliary clearers are also preferably provided, which are made in the form of flexible arms or springs 52, which are secured at their inner ends to the bands 50 and project upwardly and outwardly substantially to the peripheries of the disks. The springs are curved and preferably sharpened on their forward edges, which engage with the sides of the disks and scrape off all mud and foreign substances as the wheel rotates, and they extend out from opposite sides of the axle, so that one set will operate when the wheel is rotating in one direction and the other set when it is rotating in the other direction. The clearer 47 acts as a shield for the springs and prevents the larger stones from coming in contact with their sharp edges and dulling them.

When it is desired to use the tractor as a stationary engine, the driving-shaft is disconnected from the traction-wheels, as by removing the chains 29 and applying a belt (not shown) to a pulley 53 at one end of the shaft, which will permit of the power from the engine being transmitted to any desired point as to different kinds of agricultural machinery, &c.

Having described my invention, what I claim as new, and desire to secure by Letters Patent, is—

1. In a tractor, a main frame having vertically-arranged portions, wheel-frames journaled in the vertical portions on opposite sides of the center of the main frame, and wheels journaled in said wheel-frames.

2. In a tractor, a main frame comprising a horizontal front portion and vertical rear portions, wheel-frames journaled within the vertical rear portions and upon opposite sides of the center of the frame, and wheels mounted in said wheel-frames.

3. In a tractor, a main frame comprising a horizontal front portion and vertical rear portions, one of said vertical portions being diamond-shaped and arranged parallel with a rectangular portion at the rear end of the front portion, two wheel-frames pivotally mounted in said diamond and rectangular portions respectively upon opposite sides of the central rear portion, and a wheel journaled in each wheel-frame.

4. In a tractor, a main frame having vertically-arranged portions, wheel-frames journaled therein upon opposite sides of the center of the main frame, each side of each wheel-frame being provided with a depending support, the support at the front and rear being provided with trunnions and the side supports forming guideways, a box in each way, and a wheel in each wheel-frame with its axles journaled in said boxes.

5. In a tractor, a main frame, flexible driving mechanism thereon, wheel-frames pivotally mounted in the main frame upon opposite sides of the center thereof, a wheel in each wheel-frame, and means for connecting said wheels with the driving mechanism.

6. In a tractor, a main frame, a jointed driving-shaft thereon, wheel-frames pivotally mounted in the main frame with their pivots in line with the joints of said shaft, a bifurcated projection on each wheel-frame provided with bearings for the outer ends of one of said shafts, a sprocket-wheel in each bifurcation, a wheel in each wheel-frame, the axle of which is provided with a sprocket-wheel, sprocket-chains for connecting the sprocket-wheels on the axles with the sprocket-wheels on the driving-shaft, and means for limiting the tilting movement of the wheel-frames.

7. In a tractor, a main frame provided with a vertical rear portion, wheel-frames pivotally mounted in the main frame upon opposite sides of said vertical portion, chains from the top of each wheel-frame to the top and bottom respectively of said vertical portion for limiting the movements of the wheel-frames, and a wheel in each wheel-frame.

8. In a tractor, a main frame comprising a horizontal front portion and vertical rear portions, one of said vertical portions forming the rear end of the front portion, and inclined braces from the top and bottom of the sides of the horizontal portion to the top and bottom respectively of said vertical portion at the rear end of the front portion.

9. In a tractor, a frame provided with rear traction-wheels, each wheel comprising a plurality of curved disks and having a duplex laterally-sinuous tread in which the oppositely-located sinuosities coincide reversely, means for connecting a trailer with said frame, and means for shifting a portion of the weight of the trailer to said rear wheels.

10. In a tractor, a frame provided with traction-wheels, each wheel comprising a plurality of curved disks and having a duplex laterally-sinuous tread in which the oppositely-located sinuosities coincide reversely, and a clearer arranged between the sinuous portions of said disks.

11. In a tractor, a frame provided with traction-wheels, each wheel comprising an axle and two oppositely-curved disks thereon, a curved spring extending from the axle to the peripheries of said disks at the top, and scrapers for engaging with said disks.

12. In a tractor, a main frame, two wheel-frames pivotally mounted in the main frame, a wheel in each wheel-frame comprising an axle and two curved disks rigidly secured thereon with their similarly-curved portions opposite each other, a bar over said wheel with its ends secured to the wheel-frame, a curved spring secured to said bar and terminating in ends below the axle, a band secured to said ends and encircling the axle, and two pairs of spring-scrapers secured to the band upon opposite sides of the axle and extending to the peripheries of said disks.

In testimony whereof I affixed my signature in presence of two witnesses this 14th day of September, 1905.

BERNHARD BESKOW.

Witnesses:
M. R. SEELY,
F. M. BARTEL.